(12) United States Patent
Yang et al.

(10) Patent No.: US 10,866,919 B2
(45) Date of Patent: Dec. 15, 2020

(54) ADVANCED PERIPHERAL BUS BASED SERIAL PERIPHERAL INTERFACE COMMUNICATION DEVICE

(71) Applicant: C-SKY Microsystems Co., Ltd., Zhejiang (CN)

(72) Inventors: Jun Yang, Hangzhou (CN); Jiaqi Xi, Hangzhou (CN); Zhiwang Yang, Hangzhou (CN); Rui Cai, Hangzhou (CN)

(*) Notice: Subject to any disclaimer, the term of this patent is extended or adjusted under 35 U.S.C. 154(b) by 0 days.

(21) Appl. No.: 16/479,543

(22) PCT Filed: Nov. 8, 2018

(86) PCT No.: PCT/CN2018/114533
§ 371 (c)(1),
(2) Date: Jul. 19, 2019

(87) PCT Pub. No.: WO2019/120002
PCT Pub. Date: Jun. 27, 2019

(65) Prior Publication Data
US 2019/0361836 A1    Nov. 28, 2019

(30) Foreign Application Priority Data
Dec. 19, 2017    (CN) .......................... 2017 1 1375890

(51) Int. Cl.
*G06F 13/42* (2006.01)
*H04L 9/06* (2006.01)
(Continued)

(52) U.S. Cl.
CPC ........ *G06F 13/4282* (2013.01); *G06F 7/5095* (2013.01); *G06F 13/124* (2013.01); *H04L 9/0618* (2013.01); *H04L 9/08* (2013.01)

(58) Field of Classification Search
None
See application file for complete search history.

(56) References Cited

U.S. PATENT DOCUMENTS

2016/0219024 A1* 7/2016 Verzun .................... H04L 9/34
2016/0301669 A1  10/2016 Muma et al.

FOREIGN PATENT DOCUMENTS

CN    101819560 A    9/2010
CN    102739393 A    10/2012
(Continued)

OTHER PUBLICATIONS

International Search Report issued in related International Application No. PCT/CN2018/114533, dated Jan. 30, 2019 (2 pgs.).
(Continued)

*Primary Examiner* — Scott C Sun
(74) *Attorney, Agent, or Firm* — Finnegan, Henderson, Farabow, Garrett & Dunner, LLP

(57) ABSTRACT

Embodiments of the present disclosure provide an APB (Advanced Peripheral Bus) bus-based SPI (Serial Peripheral Interface) communication device. The device comprises: an APB interface module, an SPI bus interface module, an encryption module, and a decryption module, wherein the encryption module receives plaintext data and a key from a master via the APB interface module, generates, when enabled, ciphertext data according to the plaintext data and the key, and sends the ciphertext data to a slave via the SPI bus interface module; the decryption module receives the ciphertext data from the slave via the SPI bus interface module and receives a key from the master via the APB interface module, generates, when enabled, plaintext data according to the ciphertext data and the key, and sends the (Continued)

plaintext data to the master via the APB interface module. The present disclosure can improve the security of data transmission.

16 Claims, 6 Drawing Sheets

(51) Int. Cl.
    *G06F 7/509*     (2006.01)
    *G06F 13/12*     (2006.01)
    *H04L 9/08*     (2006.01)

(56) References Cited

FOREIGN PATENT DOCUMENTS

| CN | 204808325 U | 11/2015 |
| CN | 108123793 A | 6/2018 |

OTHER PUBLICATIONS

International Written Opinion issued in related International Application No. PCT/CN2018/114533, dated Jan. 30, 2019 (5 pgs.).
First Search Report issued in related Chinese Application No. 201711375890.4, dated Dec. 19, 2017 (1 pg.).
Supplemental Chinese Search Report issued in corresponding Chinese Application No. 201711375890.4 on Dec. 4, 2019 (1 page).

\* cited by examiner

ADVANCED PERIPHERAL BUS BASED SERIAL PERIPHERAL INTERFACE COMMUNICATION DEVICE

CROSS-REFERENCE TO RELATED APPLICATIONS

This application is a national stage filing under 35 U.S.C. § 371 of International Application No. PCT/CN2018/114533, filed on Nov. 8, 2018, and published as WO 2019/120002 A1, which claims the benefits of priority to Chinese application number 201711375890.4, filed Dec. 19, 2017, both of which are incorporated herein by reference in their entireties.

BACKGROUND

SPI (Serial Peripheral Interface) is a general serial data interface that has been extensively used at present, and its range of applications is very broad, such as computer peripherals, industrial control, and the like. SPI can either receive serial data input from a peripheral device and convert the serial data to parallel data required inside a computer, or convert parallel data inside a computer to serial data and send the serial data to a peripheral device.

For a device that does not have high requirements for serial data transmission rate, the use of SPI for serial communications is a design scheme with a relatively better cost performance ratio. But conventional SPI communication devices have limitations, one of which includes the inability to satisfy the requirements for secure communications in some communication fields. There is a need to develop a more secure SPI communication device.

SUMMARY OF DISCLOSURE

Embodiments of the present disclosure provide a device for advanced bus (e.g., Advanced Peripheral Bus or APB) bus-based SPI communications. The device can include: an advanced bus interface module configured to be connected to an APB of the master; an SPI bus interface module configured to be connected to an SPI bus of the slave; an encryption module configured to receive plaintext data and a key from the master and generate ciphertext data; and a decryption module configured to receive the ciphertext data from the slave and a key from the master and generate plaintext data. The device can also include a control module configured to control the encryption module, the decryption module, and the SPI bus interface module. When the master writes data into the slave, the transmitted plaintext data is encrypted through the encryption module, and when the master reads encrypted data stored in the slave, the encrypted data is decrypted through the decryption module. The present disclosure can perform encryption and decryption on transmitted data through hardware in SPI communications, transmit ciphertext data, and improve the security of data transmission.

DETAILED DESCRIPTIONS

To illustrate the objectives, technical solutions, and advantages of embodiments of the present disclosure more clearly, the technical solutions in the embodiments of the present disclosure are described below with reference to the accompanying drawings in the embodiments of the present disclosure. It is apparent that the described embodiments are merely some, rather than all, of the embodiments of the present disclosure. Based on the embodiments of the present disclosure, all other embodiments obtainable by a person skilled in the art without creative efforts belong to the protection scope of the present disclosure.

Figure 1:
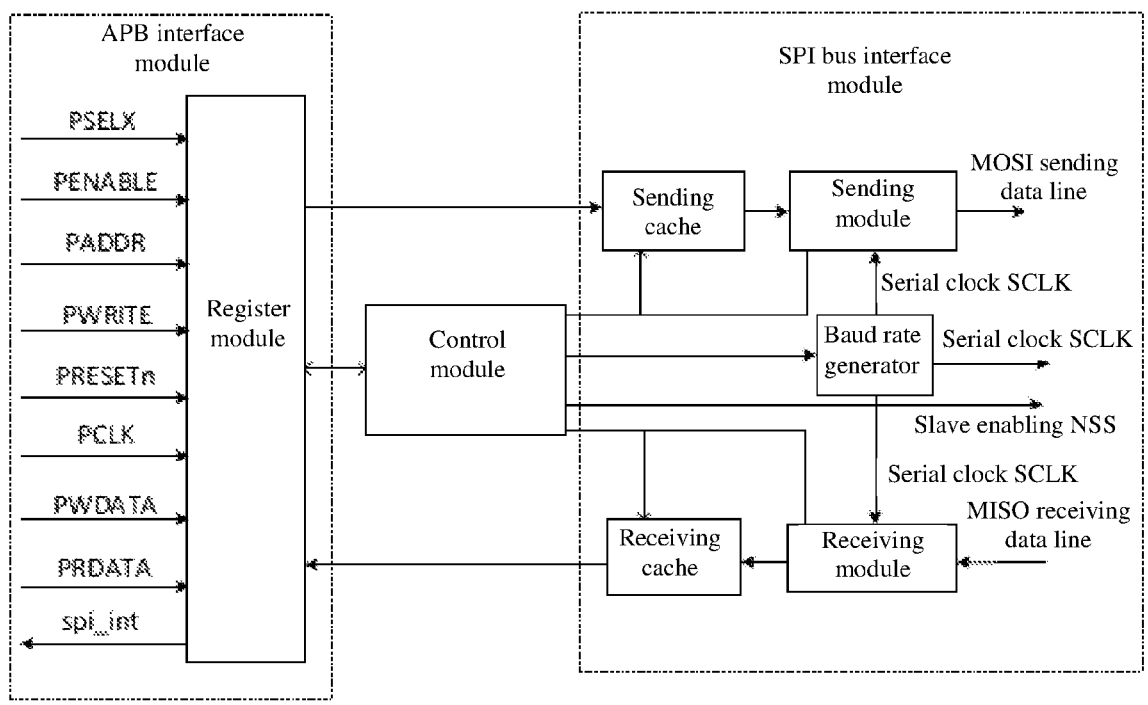
FIG. 1 is a schematic diagram of a conventional APB bus-based SPI communication device.

A conventional SPI communication device typically includes a master-side bus interface, an SPI bus interface module, and a control module. The SPI bus interface module comprises a sending module, a receiving module, and a Baud rate generator. The sending module and the receiving module may be of a dual-cache structure, and the master-side bus interface may use an APB structure. An example of the conventional SPI communication device is shown in FIG. 1.

Conventional SPI communication devices can only transmit plaintext data, and the devices cannot meet the requirements for secure communications in some communication fields requiring high security, such as information security cards, military fields, and the like. Therefore, there is a need to develop a more secure SPI communication device.

To overcome the issues with conventional devices, the disclosed embodiments describe a device that enables encryption and decryption of data and provide SPI communications that are more secure.

Figure 2:
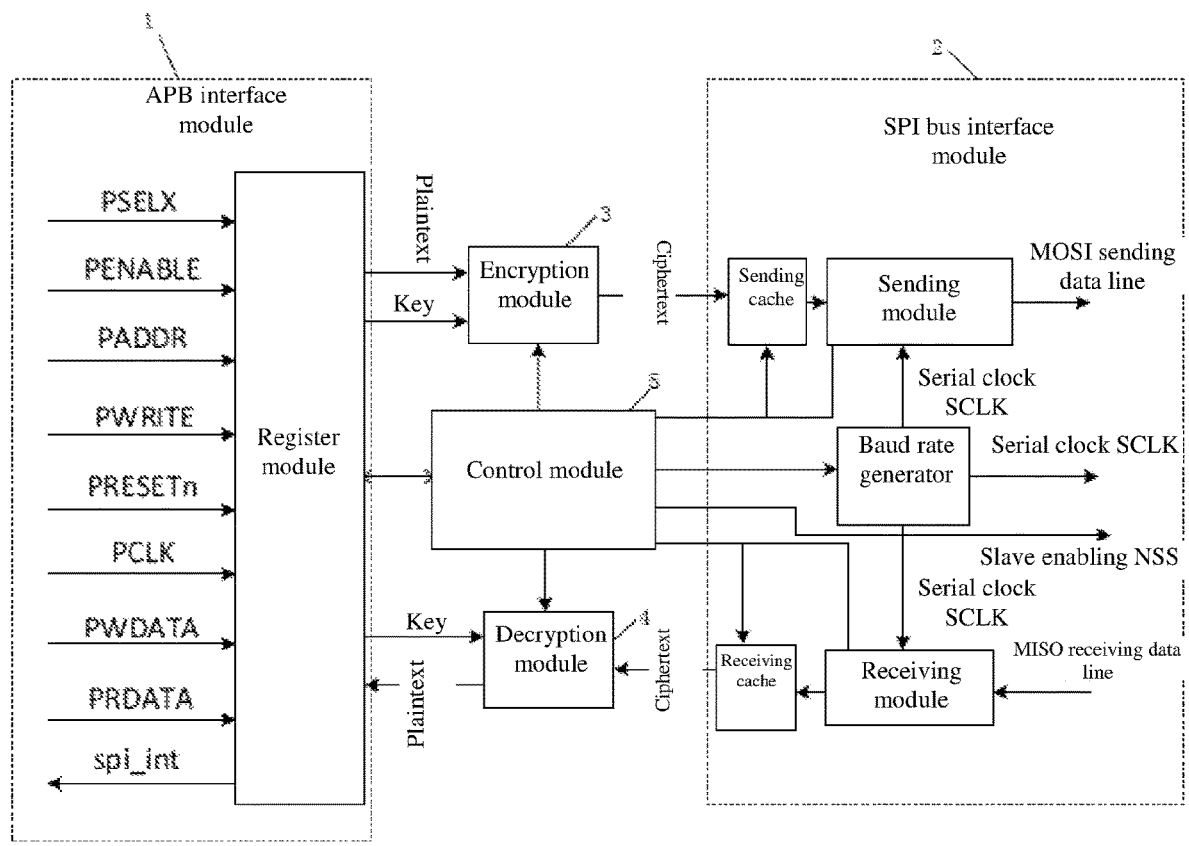
FIG. 2 is a schematic diagram of an exemplary APB bus-based SPI communication device according to some embodiments of the present disclosure.

Some embodiments of the present disclosure provide an APB bus-based SPI communication device for SPI communications between a master and a slave. FIG. 2 is a schematic diagram of an APB bus-based SPI communication device, according to some embodiments of the present disclosure. As shown in FIG. 2, the device comprises APB interface module 1, SPI bus interface module 2, encryption module 3, decryption module 4, and control module 5.

APB interface module 1 is connected to an APB of the master (not shown) and is responsible for communications with the master.

SPI bus interface module 2 is connected to an SPI bus of the slave (not shown) and is responsible for communications with the slave.

Encryption module 3 receives plaintext data and a key from the master via APB interface module 1. Encryption module 3 is subject to the enabling control by control module 5. When enabled by control module 5, encryption module 3 generates ciphertext data according to the plaintext data and the key and sends the ciphertext data to the slave via SPI bus interface module 2.

Decryption module 4 receives the ciphertext data from the slave via SPI bus interface module 2 and receives a key from the master via APB interface module 1. Decryption module 4 is subject to the enabling control by control module 5. When enabled by control module 5, decryption module 4 generates plaintext data according to the ciphertext data and the key, and sends the plaintext data to the master via APB interface module 1.

Control module 5 receives a control instruction from the master via APB interface module 1. According to the control instruction, control module 5 controls encryption module 3, decryption module 4, and SPI bus interface module 2 and feeds a state signal of control module 5 back to the master via APB interface module 1.

In some embodiments, the slave functions as a memory and comprises a memory chip having an SPI bus. The master can write data into the slave; alternatively, the master can read data stored in the slave.

With the APB bus-based SPI communication device provided in some embodiments of the present disclosure, when the master writes data into the slave, the transmitted plaintext data is encrypted through the encryption module. When the master reads encrypted data stored in the slave, the encrypted data is decrypted through the decryption module. Compared with conventional systems, embodiments of the present disclosure can perform encryption and decryption on transmitted data through hardware in SPI communications, transmit ciphertext data, and improve the security of data transmissions for providing more secure communications.

Figure 3:
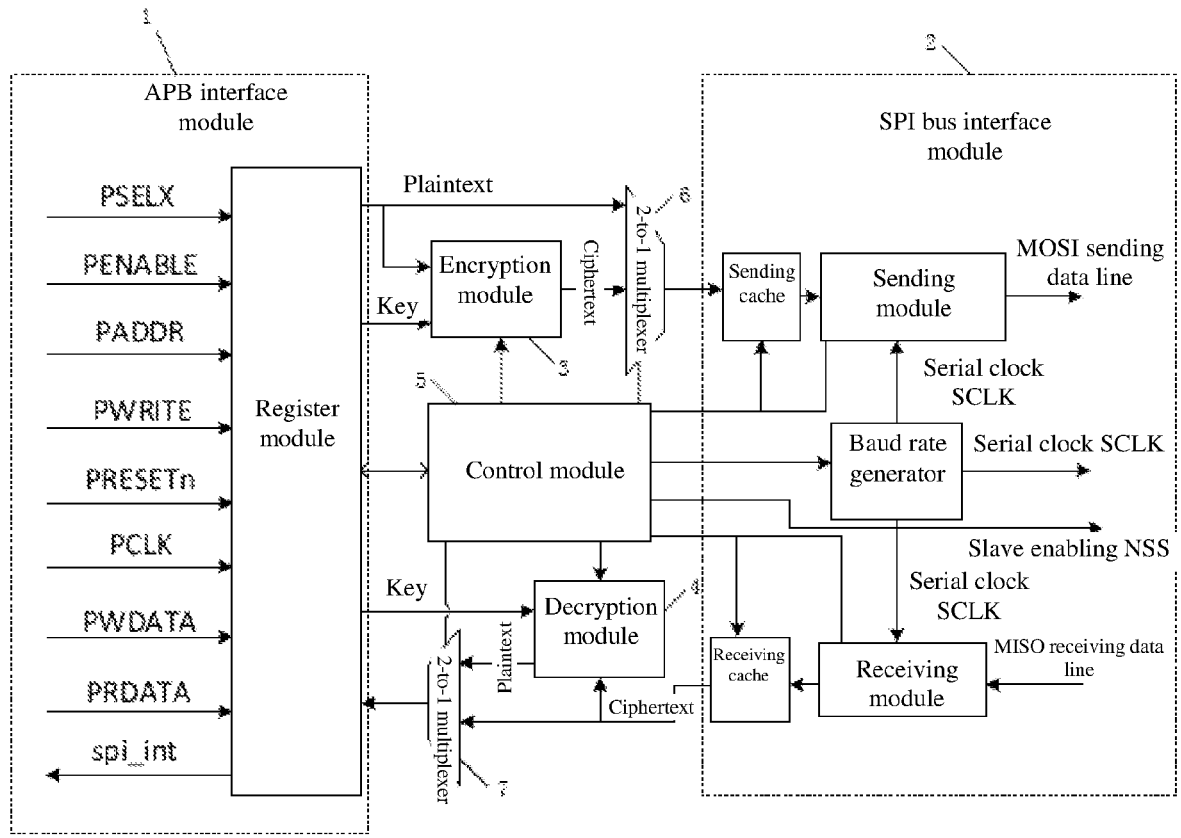
FIG. 3 is a schematic diagram of an exemplary APB bus-based SPI communication device according to some embodiments of the present disclosure.

FIG. 3 is a schematic diagram of an APB bus-based SPI communication device according to some embodiments of the present disclosure. As shown in FIG. 3, the APB bus-based SPI communication device comprises two 2-to-1 multiplexers 6 and 7. For example, multiplexers 6 and 7 can be 8 bits. Multiplexer 6 works with encryption module 3, while multiplexer 7 works with decryption module 4.

Multiplexer 6 receives as input the plaintext data from APB interface module 1 and the ciphertext data outputted by encryption module 3, and selects to output either the plaintext data or the ciphertext data as controlled by control module 5. If encryption module 3 is enabled, control module 5 controls to select outputting the ciphertext data to SPI bus interface module 2. On the other hand, if encryption module 3 is not enabled, the key from the master is invalid and control module 5 controls to select outputting the plaintext data to SPI bus interface module 2.

Multiplexer 7 receives the ciphertext data inputted from SPI bus interface module 2 and the plaintext data outputted by decryption module 4, and selects to output either the plaintext data or the ciphertext data as controlled by control module 5. If decryption module 4 is enabled, control module 5 controls to select outputting the plaintext data after decryption to APB interface module 1. On the other hand, if decryption module 4 is not enabled, the key from the master is invalid and control module 5 controls to select outputting the received ciphertext data to APB interface module 1.

The working principle of the APB bus-based SPI communication device provided in some embodiments of the present disclosure is introduced in detail below.

APB interface module 1 comprises an interrupt request signal line and all signal lines defined by the APB. The interrupt request signal spi_int stays at a low level when there is no interrupt request and stays at a high level when an interrupt request occurs. The APB is defined by the AMBA (Advanced Microcontroller Bus Architecture) protocol.

In an idle state, both the select signal (PSEL) and the enable signal (PENABLE) are low, and data (PDATA) and address (PADDR) are invalid.

Figure 4:
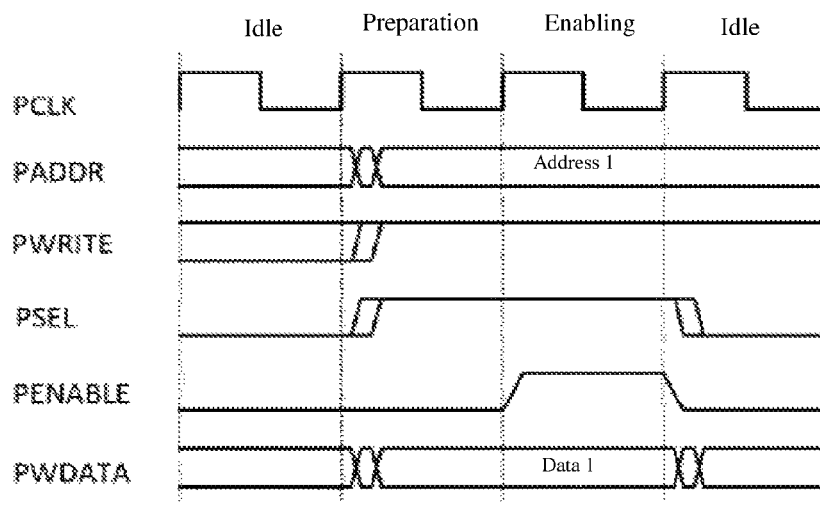
FIG. 4 is an exemplary timing diagram of data writing by an APB, according to some embodiments of the present disclosure.

When one APB write operation takes place, a timing sequence can occur based on the diagram shown in FIG. 4. In the preparation period, the master has the data (PWDATA) and address (PADDR) ready, and at the same time sets the select signal (PSEL) to high. In the enabling period, the enable signal (PENABLE) is set to high. These signals are maintained until the rising edge at the end of the enabling period. And at this rising edge, data is written into a corresponding register according to the address.

Figure 5:
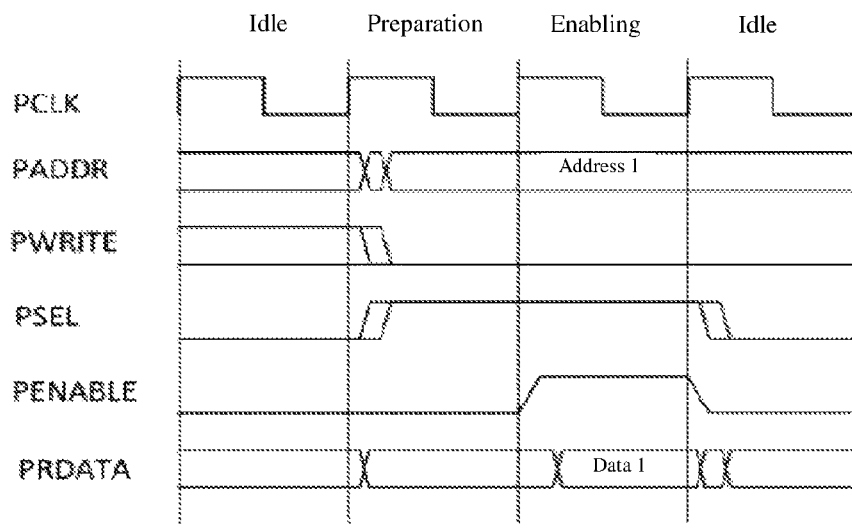
FIG. 5 is an exemplary timing diagram of data reading by an APB, according to some embodiments of the present disclosure.

When one APB read operation takes place, a timing sequence can occur based on the diagram shown in FIG. 5. In the preparation period, the master has the address (PADDR) ready, and at the same time, sets the select signal (PSEL) to high. In the enabling period, the enable signal (PENABLE) is set to high. At the same time, the APB interface module has the data (PRDATA) ready according to the address. These signals are maintained until the rising edge at the end of the enabling period, and at this rising edge, the master reads the data.

SPI bus interface module 2 comprises two signal lines for receiving MISO (master input slave output) and sending MOSI (master output slave input), a serial clock signal line SCLK, and a slave enable signal line NSS, which is controlled by the master and supports communications with other SPI slaves. There are four different modes of SPI communications, and the communications mode is controlled through CPOL (clock polarity) and CPHA (clock phase), wherein the clock polarity CPOL is used to configure states in which the SCLK level is in an idle state or an active state, and the clock phase CPHA is used to configure on which edge the data sampling is carried out.

Figure 6:
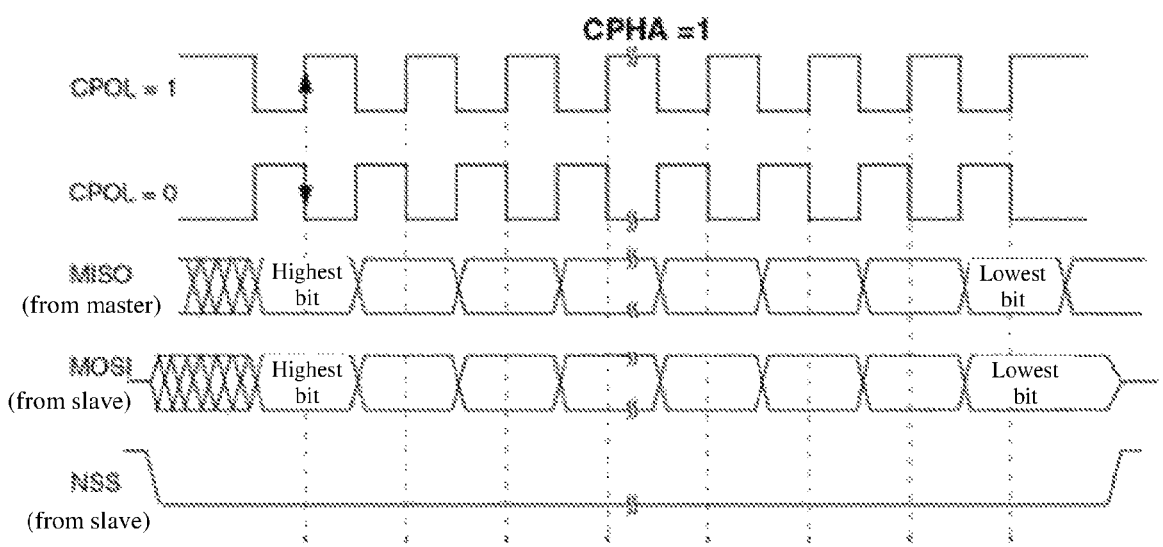
FIG. 6 is an exemplary timing diagram of SPI data transmission when CPHA=1, according to some embodiments of the present disclosure.

FIG. 6 is an exemplary timing diagram of SPI data transmission when CPHA=1, according to some embodiments of the present disclosure. When data is being sent, the Baud rate generator generates the serial clock signal line SCLK. The sending module monitors that the enable signal line NSS goes low, and parallel data is sent, according to the clock polarity and the clock phase, via the MOSI sending data line as serial data in the communication format described above.

Figure 7:
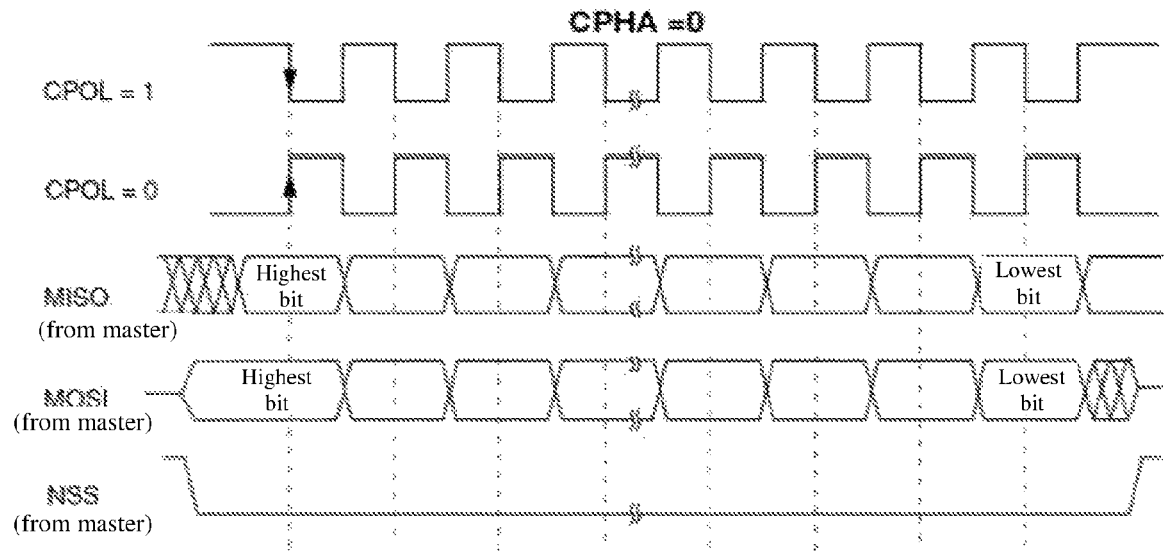
FIG. 7 is an exemplary timing diagram of SPI data transmission when CPHA=0, according to some embodiments of the present disclosure.

FIG. 7 is an exemplary timing diagram of SPI data transmission when CPHA=0, according to some embodiments of the present disclosure. When data is being received, the Baud rate generator generates the serial clock signal line SCLK, the receiving module monitors that the enable signal line NSS goes low, and the receiving data line RXD is sampled once according to the clock polarity and the clock phase. When the data sampling is completed, the parallel data is placed in a receiving cache.

An example is provided below for encryption module 3 and decryption module 4. The example uses the hardware bitstream encryption method, which only indicates the feasibility of the modules, and the specific implementation is not limited to this method.

Encryption module 3 in the example generates ciphertext data according to the plaintext data and the key. The plaintext data and the ciphertext data have the same width, which can be 8 bits, 16 bits, 32 bits, or 64 bits, and the key has a width of 32 bits, 64 bits, 128 bits, or 256 bits. The plaintext data and ciphertext data in the example are 8-bit.

Figure 8:
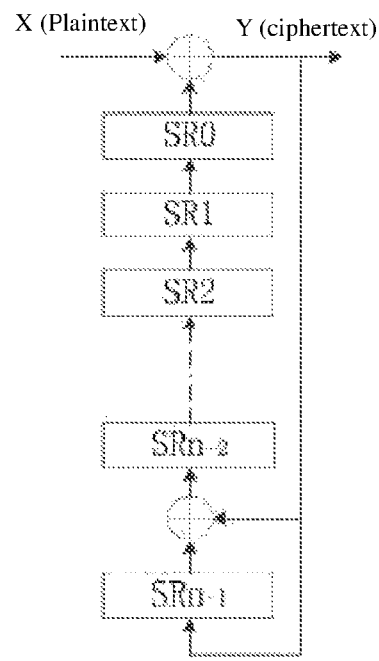
FIG. 8 is a schematic diagram of an exemplary circuitry within the encryption module, according to some embodiments of the present disclosure.

FIG. 8 is a schematic diagram of some circuitry within encryption module 3, according to some embodiments of the present disclosure. For example, 8 groups of the circuitry shown on FIG. 8 jointly form encryption module 3 and complete one encryption of an 8-bit data within one clock period.

In the example, when the key has 32 bits, n=4. In such an example, the circuitry shown in FIG. 8 would comprise 4 SR registers and 2 adders. The initial values of the 4 SR registers are 4 bits of the key (the $1^{st}$ bit of the plaintext data corresponds to bits 1-4 of the key, the $2^{nd}$ bit of the plaintext data corresponds to bits 5-8 of the key, . . . , so on and so forth, and the $8^{th}$ bit of the plaintext data corresponds to bits 29-32 of the key).

When the key has 64 bits, n=8, and the circuitry shown in FIG. 8 would comprise 8 SR registers and 2 adders. The initial values of the 8 SR registers are 8 bits of the key (the $1^{st}$ bit of the plaintext data corresponds to bits 1-8 of the key, the $2^{nd}$ bit of the plaintext data corresponds to bits 9-16 of the key, . . . , so on and so forth).

When the key has 128 bits, n=16, and the circuitry shown in FIG. 8 would comprise 16 SR registers and 2 adders. The initial values of the 16 SR registers are 16 bits of the key (the $1^{st}$ bit of the plaintext data corresponds to bits 1-16 of the key, the $2^{nd}$ bit of the plaintext data corresponds to bits 17-32 of the key, . . . , so on and so forth).

When the key has 256 bits, n=32, and the circuitry shown in FIG. 8 would comprise 32 SR registers and 2 adders. The initial values of the 32 SR registers are 32 bits of the key (the $1^{st}$ bit of the plaintext data corresponds to bits 1-32 of the key, the $2^{nd}$ bit of the plaintext data corresponds to bits 33-64 of the key, . . . , so on and so forth).

When 1 bit of the plaintext data is encrypted, the ciphertext Y=X+SR0 is outputted and written back into SRn-1. SRn-2=SRn-1+Y, and the other SR0~SRn-3 are all SR(i-1)=SR(i), i is 1 to n-2.

Decryption module 4 in the example generates plaintext data according to the ciphertext data and the key. The plaintext data and the ciphertext data have the same width, which can be 8 bits, 16 bits, 32 bits, or 64 bits, and the key has a width of 32 bits, 64 bits, 128 bits, or 256 bits. The plaintext data and ciphertext data in the example is 8-bit.

Figure 9:
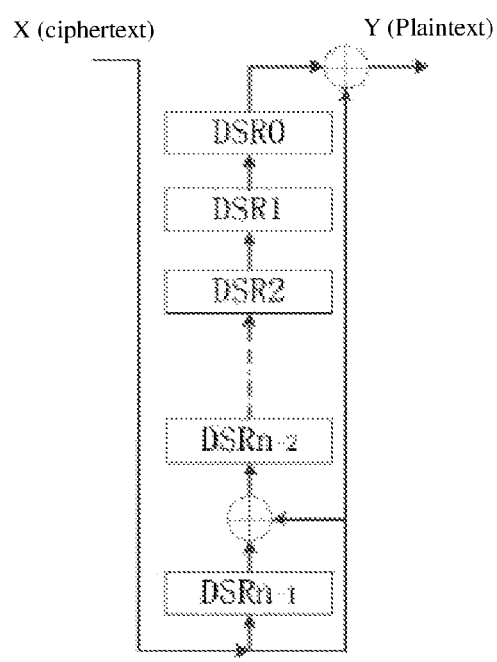
FIG. 9 is a schematic diagram of an exemplary circuitry within the decryption module, according to some embodiments of the present disclosure.

FIG. 9 is a schematic diagram of some circuitry within decryption module 4, according to some embodiments of the present disclosure. The circuitry shown on FIG. 9 jointly form decryption module 4 and complete one decryption of an 8-bit data within one clock period.

In the example, when the key has 32 bits, n=4. In such an example, the circuitry shown in FIG. 9 would comprise 4 DSR registers and 2 adders. The initial values of the 4 DSR registers are 4 bits of the key (the $1^{st}$ bit of the ciphertext data corresponds to bits 1-4 of the key, the $2^{nd}$ bit of the ciphertext data corresponds to bits 5-8 of the key, . . . , so on and so forth, and the $8^{th}$ bit of the ciphertext data corresponds to bits 29-32 of the key).

When the key has 64 bits, n=8, and the circuitry shown in FIG. 9 would comprise 8 DSR registers and 2 adders. The initial values of the 8 DSR registers are 8 bits of the key (the $1^{st}$ bit of the ciphertext data corresponds to bits 1-8 of the key, the $2^{nd}$ bit of the ciphertext data corresponds to bits 9-16 of the key, . . . , so on and so forth).

When the key has 128 bits, n=16, and the circuitry shown in FIG. 9 would comprise 16 DSR registers and 2 adders. The initial values of the 16 DSR registers are 16 bits of the key (the $1^{st}$ bit of the ciphertext data corresponds to bits 1-16 of the key, the $2^{nd}$ bit of the ciphertext data corresponds to bits 17-32 of the key, . . . , so on and so forth).

When the key has 256 bits, n=32, and the circuitry shown in FIG. 9 would comprises 32 DSR registers and 2 adders. The initial values of the 32 DSR registers are 32 bits of the key (the $1^{st}$ bit of the ciphertext data corresponds to bits 1-32 of the key, the $2^{nd}$ bit of the ciphertext data corresponds to bits 33-64 of the key, . . . , so on and so forth).

When 1 bit of the ciphertext data is decrypted, the plaintext Y=X+DSR0 is outputted, and at the same time, X is written into DSRn-1. DSRn-2=DSRn-1+X, and the other DSR0~DSRn-3 are all DSR(i-1)=DSR(i), i is 1 to n-2.

With the above encryption module and decryption module, ciphertext data can be transmitted in SPI communications between the master and the slave, which improve the security of data transmission.

It is appreciated that all or some processes in the method according to the above embodiments can be implemented through a computer program instructing relevant hardware. The program can be stored in a computer readable storage medium. During execution, the program can comprise processes of the embodiments of the above methods, wherein the storage medium can be magnetic disks, optical disks, Read-Only Memory (ROM), Random Access Memory (RAM), and the like.

Some specific embodiments of the present disclosure are described above, but the protection scope of the present disclosure is not limited to these embodiments. Any variation or substitution that can be easily conceived of by a person skilled in the art within the technical scope of the present disclosure shall fall within the protection scope of the present disclosure. Therefore, the protection scope of the present disclosure shall be subjected to the protection scope of the claims.

The invention claimed is:

1. A device for SPI (Serial Peripheral Interface) communications between a master and a slave, comprising:
    a first interface module communicatively coupled to an advanced bus of the master;
    a second interface module communicatively coupled to an SPI bus of the slave;
    an encryption module configured to receive plaintext data and a key from the master via the first interface module, to generate ciphertext data according to the plaintext data and the key, and to send the ciphertext data to the slave via the second interface module; and
    a decryption module configured to receive the ciphertext data from the slave via the second interface module, to receive a key from the master via the first interface module, to generate plaintext data according to the ciphertext data and the key, and to send the plaintext data to the master via the first interface module.

2. The device of claim 1, wherein the advanced bus is an Advanced Peripheral Bus (APB).

3. The device according to claim 1, further comprising a control module configured to receive a control instruction from the master via the first interface module, wherein the control instruction is used to control the encryption module, the decryption module, and the second interface module, and feed a state signal back to the master via the first interface module.

4. The device according to claim 3, wherein the device further comprises a first 2-to-1 multiplexer configured to receive the plaintext data inputted from the first interface module and the ciphertext data outputted by the encryption module and to select to output the plaintext data or the ciphertext data as controlled by the control module.

5. The device according to claim 3, wherein the device further comprises a second 2-to-1 multiplexer configured to receive the ciphertext data inputted from the second interface module and the plaintext data outputted by the decryption module and to select to output the plaintext data or the ciphertext data as controlled by the control module.

6. The device according to claim 1, wherein the encryption module comprises adders and SR (scramble register) registers.

7. The device according to claim 1, wherein the decryption module comprises adders and DSR (descramble register) registers.

8. The device according to claim 1, wherein the plaintext data and the ciphertext data have a width of 8 bits, 16 bits, 32 bits, or 64 bits.

9. The device according to claim 1, wherein the key has a width of 32 bits, 64 bits, 128 bits, or 256 bits.

10. The device according to claim 1, wherein the slave is a memory having an SPI bus.

11. The device according claim 1, wherein the first interface module comprises an interrupt request signal line and an advanced bus defined by the AMBA (Advanced Microcontroller Bus Architecture) protocol.

12. The device according to claim 1, wherein the second interface module comprises a data receiving signal line, a data sending signal line, a serial clock signal line, and a slave enabling signal line.

13. A method for providing SPI (Serial Peripheral Interface) communications between a master and a slave, wherein the master includes an advanced bus and the slave includes an SPI bus, the method comprising:
 receiving plaintext data and a key from the master via an advanced bus interface module communicatively coupled to the advanced bus of the master;
 generating ciphertext data according to the plaintext data and the key; and
 sending the ciphertext data to the slave via an SPI bus interface module communicatively coupled to the SPI bus of the slave.

14. The method of claim 13, wherein the advanced bus comprises of an Advanced Peripheral Bus (APB).

15. A method for providing SPI (Serial Peripheral Interface) communications between a master and a slave, wherein the master includes an advanced bus and the slave includes an SPI bus, the method comprising:
 receiving ciphertext data from the slave via an SPI bus interface module communicatively coupled to the SPI bus of the slave;
 receiving a key from the master via an advanced bus interface module communicatively coupled to the advanced bus of the master;
 generating plaintext data according to the ciphertext data and the key, and
 sending the plaintext data to the master via the advanced bus interface module.

16. The method of claim 15, wherein the advanced bus comprises of an Advanced Peripheral Bus (APB).

* * * * *

UNITED STATES PATENT AND TRADEMARK OFFICE
CERTIFICATE OF CORRECTION

PATENT NO. : 10,866,919 B2
APPLICATION NO. : 16/479543
DATED : December 15, 2020
INVENTOR(S) : Jun Yang et al.

Page 1 of 1

It is certified that error appears in the above-identified patent and that said Letters Patent is hereby corrected as shown below:

On the Title Page

Column 1, Item (71), in the Applicant, Line 2, "Zhejiang (CN)" should read --Hangzhou, Zhejiang (CN)--.

Column 1, Item (30), in the Foreign Application Priority Data, "2017 1 1375890" should read --201711375890.4--.

In the Claims

In Claim 11, Column 7, Line 24, "according claim 1," should read --according to claim 1,--.

Signed and Sealed this
Ninth Day of January, 2024

Katherine Kelly Vidal
*Director of the United States Patent and Trademark Office*